(12) United States Patent
Solan et al.

(10) Patent No.: US 6,789,729 B1
(45) Date of Patent: Sep. 14, 2004

(54) METHOD FOR RECEIVING AND SHIPPING ITEMS

(75) Inventors: Brendan Solan, Redford, MI (US); Victor Kudyba, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 127 days.

(21) Appl. No.: 09/705,036

(22) Filed: Nov. 2, 2000

(51) Int. Cl.[7] .............................................. G06F 17/00
(52) U.S. Cl. ...................... 235/375; 235/384; 235/385; 235/383; 705/22; 705/28
(58) Field of Search .............................. 705/21, 22, 28; 235/385, 383, 384, 389, 380, 487, 375; 209/3.3, 584; 382/101; 340/825.54

(56) References Cited

U.S. PATENT DOCUMENTS

| | | | |
|---|---|---|---|
| 3,661,098 A | * 5/1972 | Jaekle et al. | 410/6 |
| 4,776,464 A | * 10/1988 | Miller et al. | 209/3.3 |
| 4,832,204 A | * 5/1989 | Handy et al. | 60/39.182 |
| 5,038,023 A | * 8/1991 | Saliga | 235/385 |
| 5,477,038 A | * 12/1995 | Levine et al. | 235/380 |
| 5,635,693 A | 6/1997 | Benson et al. | |
| 5,712,789 A | 1/1998 | Radican | |
| 5,804,810 A | 9/1998 | Woolley et al. | |
| 5,866,888 A | * 2/1999 | Bravman et al. | 235/375 |
| 5,887,176 A | 3/1999 | Griffith et al. | |
| 5,920,287 A | 7/1999 | Belcher et al. | |
| 5,962,834 A | 10/1999 | Markman | |
| 5,971,587 A | * 10/1999 | Kato et al. | 700/115 |
| 6,014,628 A | 1/2000 | Kovarik, Jr. | |
| 6,026,378 A | * 2/2000 | Onozaki | 705/28 |
| 6,097,301 A | * 8/2000 | Tuttle | 340/693.9 |
| 6,156,988 A | * 12/2000 | Baker | 209/583 |
| 6,405,125 B1 | * 6/2002 | Ayed | 701/200 |
| 6,429,776 B1 | * 8/2002 | Alicot et al. | 340/572.1 |
| 6,665,585 B2 | * 12/2003 | Kawase | 700/226 |

FOREIGN PATENT DOCUMENTS

| | | |
|---|---|---|
| DE | 4432736 | 6/1995 |
| DE | 19704210 | 6/1998 |
| JP | 2000142926 | 5/2000 |
| WO | WO 97/086628 A1 | 3/1997 |
| WO | WO 97/50057 A1 | 12/1997 |

* cited by examiner

Primary Examiner—Diane I. Lee
Assistant Examiner—Kumiko C. Koyama
(74) Attorney, Agent, or Firm—David B. Kelley

(57) ABSTRACT

A method for receiving and shipping vehicles or other manufactured items in which the items are assigned several identification numbers and in which the transport conveyances and/or railcars are similarly and respectively assigned several identification numbers. These identification numbers cooperatively allow the vehicles to be quickly located within a storage yard facility and to be efficiently and accurately assigned to a transport vehicle or railcar, effective to allow the vehicles to be transported to a desired destination.

22 Claims, 1 Drawing Sheet

US 6,789,729 B1

METHOD FOR RECEIVING AND SHIPPING ITEMS

FIELD OF THE INVENTION

The present invention generally relates to a method for receiving and shipping items and more particularly to a method for receiving manufactured items, such as vehicles which are to be transported to a variety of desired destinations, for efficiently sorting these received items in a manner which substantially increases the liklihood that these items will be respectively transported to these certain desired destinations, and for efficiently shipping these sorted items to these desired destinations.

BACKGROUND OF THE INVENTION

Items, such as vehicles, are usually transported to and temporarily stored within a relatively large yard or "staging area" which is relatively close to the manufacturing plant at which the vehicles were created. These vehicles or other items are respectively required to be shipped to a wide variety of locations or destinations and typically remain in the yard until placed upon a truck, railcar, or other vehicle or conveyance for transport to their respective destination.

Typically, vehicles are driven into the yard as they are created by the manufacturing plant. The respective destination of each of these vehicles is usually coded and contained within or placed upon a route code label which is selectively attached to the "passenger side window" of each of the respective vehicles. Oftentimes, these vehicles are placed at any convenient location within the yard and substantially no record is maintained of the current location of each of the vehicles within the yard.

Hence, one or more individuals are typically required to frequently "search the yard" in order to identify groups of vehicles which are "bound for" or which are to be transported to the same destination. Such "manual identification" or manual sorting not only undesirably increases the amount of time required to ship these vehicles but further increases the liklihood of error, thereby causing some of the vehicles to be transported to an incorrect destination. Further, this arrangement does not allow a certain vehicle to be quickly and easily identified within the yard in order to allow the vehicle to be serviced before shipment. For example and without limitation, certain quality concerns may arise relative to certain components contained within a manufactured vehicle after it has been placed into the yard but before it has been shipped, thereby necessitating a repair or modification of the temporarily stored vehicle. Hence, it is highly desirable to allow a vehicle to be quickly identified in order to allow the vehicle to be serviced and/or modified before it is shipped.

A number of transport conveyances or railcars are also typically present in close proximity to the yard and are selectively and cooperatively used to transport these vehicles to the respectively required and desired destinations. Each of these conveyances and/or railcars must typically be manually identified by these individuals and correctly associated with a certain destination (i.e. each conveyance or railcar is to travel to a certain destination from the yard and each of these respective destinations must be manually and correctly identified and used with the vehicle destination information to determine the identity of those vehicles which are respectively "loaded onto" each of the conveyances or railcars). Such manual identification not only undesirably increases the overall time and the cost of shipping such vehicles, but also undesirably increases the liklihood of shipment error.

There is therefore a need for a new and improved method for receiving and shipping items which overcomes at least some of the previously delineated drawbacks of prior methods.

SUMMARY OF THE INVENTION

It is a first object of the present invention to provide a method for receiving and shipping items which overcomes at least some of the previously delineated drawbacks of prior methods.

It is a second object of the present invention to provide a method for receiving and shipping items which overcomes at least some of the previously delineated drawbacks of prior methods and which provides a substantially accurate indication of the location of each received item within a storage yard.

It is a third object of the present invention to provide a method for receiving and shipping items which overcomes at least some of the previously delineated drawbacks of prior methods and which automatically identifies each of the vehicles, conveyances, and/or railcars which are to transport these items and their respective final destinations.

It is a fourth object of the present invention to provide a method for receiving and shipping items which overcomes at least some of the previously delineated drawbacks of prior methods and which automatically identifies a desired destination for each of the items and which further automatically and/or electronically stores the location of each of the items within a storage yard or facility.

According to a first aspect of the present invention, a method for receiving goods is provided. The method comprises the steps of providing a yard; receiving an item; placing the item at a certain location within the yard; and storing the certain location, effective to allow the item to be quickly located.

According to a second aspect of the present invention a method for shipping an item to a certain destination is provided. The method comprises the steps of providing a unique identification code for the item; providing a second unique identification code for the destination; providing a device; communicating the first and second unique identification codes to the device, thereby allowing the item to be shipped to the certain destination.

These and other aspects, features, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
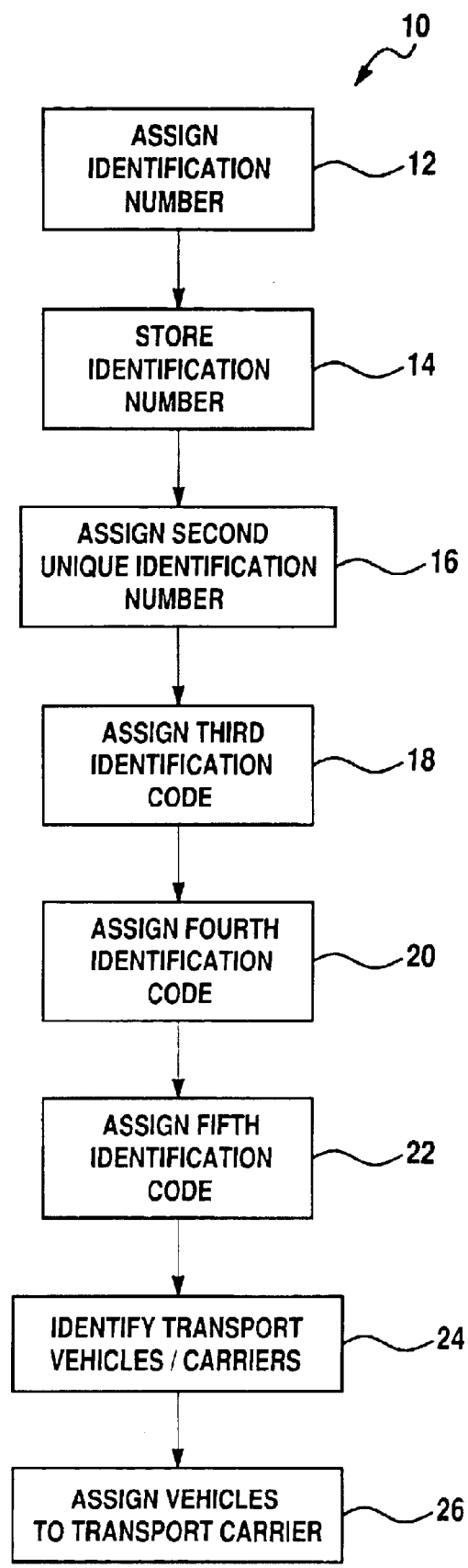
FIG. 1 is a flowchart illustrating the sequence of steps included within and/or comprising the methodology of the preferred embodiment of the invention.

Referring now to FIG. 1, there is shown a flowchart 10 which illustrates the sequence of operational steps which are included within and/or which cooperatively comprise the methodology of the preferred embodiment of the invention.

Particularly, flowchart and/or methodology 10 begins with an initial step 12 in which a unique identification number is assigned to each manufactured or created item, such as a vehicle. It should be appreciated that while the following discussion describes the use of methodology 10 with manufactured vehicles, the methodology 10 may similarly be used with a variety of other manufactured and/or created items and that nothing in this application should limit the applicability of the methodology 10 to only use with vehicles. Step 14 follows step 12 and, in this step, each unique vehicle identification code is stored within a computerized or electronic database.

Step 16 follows step 14 and, in this step, a second unique identification number is assigned to each manufactured vehicle and each manufactured vehicle receives a selectively readable device or "tag" assembly which is disposed upon or coupled to the vehicle. In one embodiment, this tag comprises a location determination device (e.g., a transceiver or transponder) which may selectively transmit geographic coordinates corresponding to the present location of the vehicle or which may be used within a system which selectively interrogates the tag effective to allow the vehicle locations to be identified. One example of such a "tag" or location system is described within U.S. Pat. No. 5,920,287 (the '287 patent) which is fully and completely incorporated herein by reference. Each such tag may also include a "bar code" type storage device which may selectively receive and store desired information and which may be selectively read by a "bar code" type or optical scanner.

Particularly, each such tag assembly or device stores the second unique identification code associated with and/or uniquely identifying the vehicle upon which the tag is contained or disposed. Moreover, in this step, each first unique vehicle identification code is associated with or "cross referenced to" one of the second unique identification codes within the stored database. In the preferred embodiment of the invention, the device may be "read" or automatically scanned as the vehicle enters a storage yard or reception area. In this manner, each vehicle has a first and a second unique and selectively readable identification code.

Step 18 follows step 16 and, in this step, a third identification code is assigned to each of the manfactured vehicles or received items and is respectively indicative of the destination of each such vehicle. The third identification code is stored within the database and may also be stored within the location determination device or tag assembly. Hence, at the conclusion of step 18, each manufactured vehicle may be selectively referenced within a relational or computer database by use of a stored first, second, and third identification code.

Step 20 follows step 18 and, in this step, each of the manufactured vehicles is associated with and/or "cross referenced" to a fourth identification code which indicates the status of the vehicle.

For example, it may be desirable to allow the manufacturing plant to remove a vehicle from the yard within a certain amount of time after the vehicle has been delivered in order to allow the plant personnel to service or repair on the vehicle. Moreover, it may also be desirable to allow plant personnel or other individuals or entities to place a "hold" condition on the vehicle in order to prevent the vehicle from being shipped due to some identified and potential malfunction. In the preferred embodiment of the invention, only manufactured vehicles having a certain status may be shipped and the respective status may be selectively placed within each of the respective tags (i.e., stored as the fourth identification code).

Step 22 follows step 20 and, in this step, each vehicle is assigned a fifth identification code which is respectively indicative of the vehicle's location within the yard. This location code is altered or modified as the vehicle is moved within the yard. Alternatively, as previously delineated, each tag is adapted to selectively provide this information upon receipt of a request or query type command from a device or a system such as that described within the '287 patent, which allows this "location information" to be selectively obtained. Any of the identification codes assigned to the vehicles may be changed or altered automatically and electronically to reflect a change in status, destination or location within the yard. Step 24 follows step 22 and, in this step, each of the various transport carriers and/or conveyances are identified.

Step 26 follows step 24 and, in this step, each vehicle is assigned to one of previously identified transport conveyances or railcars by a computer or by a dispatcher by use of one or more of the previously delineated identification numbers. That is, each "shippable vehicle" (i.e. each vehicle having a certain "shippable" status) is assigned to one of the transport conveyances or railcars such that a vehicle is placed upon a railcar or transport conveyances having a respective destination which is substantially similar to the destination of that vehicle. In one embodiment of the invention, a list may be automatically and selectively generated in order to substantially ensure that the vehicles are correctly "matched" to the railcars and transport conveyances (i.e., a list of all vehicles required to be transported to each respective destination is created). Further, in another non-limiting embodiment, a sixth identification number is assigned to each vehicle and this number, having a selected one of several values, indicates whether a vehicle has been transported or shipped from the yard, thereby allowing a record to be created of the transportation status of each vehicle. Moreover, each readable device or "tag" is removed from each vehicle before the vehicle is shipped and may be used with newly received vehicles in the previously delineated manner.

It should be realized that the invention is not limited to the exact construction which has been described above, but that various changes may be made without departing from the spirit and the scope of the invention as is more fully delineated within the following claims.

What is claimed is:

1. A method for automatically tracking an item such as a vehicle within a storage area that is received by the storage area, stored in the storage area and shipped out of the storage area, said method comprising the steps of:

assigning a first item identifier indicative of an identity of the item, a destination identifier indicative of a predetermined destination for the item, a status identifier indicative of a status of the item, a transport means identifier indicative of how the item will be shipped, and a storage location identifier indicative of a storage location of the item within a storage area containing a plurality of stored items;

storing the first item identifier, destination identifier, status identifier, and location identifier in a first selectively programmable identification device having a memory that is operatively in communication with a second selectively programmable interrogation device having a memory that is also operatively in communication with a computer system;

assigning a second item identifier to the item that associates the item with the first item identifier, wherein the second item identifier is stored in the memory of the first selectively programmable identification device;

affixing the first selectively programmable identification device to the item; and using the second selectively programmable interrogation device to identify a predetermined item among the plurality of stored items by interrogating each of the stored item's first selectively programmable identification device and comparing the first item identifier with the second item identifier until the predetermined item is identified, and to read the destination identifier, status identifier and storage identifier if the first item identifier compares to the second item identifier, in order to track the location of the identified item within the storage area.

2. A method as set forth in claim 1, further including the step of programing the selectively programmable identification device with the first item identifier, destination identifier, status identifier, transport means identifier, and the storage location identifier when the item is received.

3. A method as set forth in claim 1 further including the step of modifying the storage location identifier if the item is moved to another storage location within the storage area.

4. A method as set forth in claim 1 further including the step of removing the first selectively programmable identification device before the item is shipped from the storage area.

5. A method as set forth in claim 1 wherein the first selectively programmable identification device includes a processor, a memory and a transceiver and the second selectively programmable identification device includes a processor, a memory and a transceiver.

6. A method as set forth in claim 1 further including the step of the first programmable identification device selectively transmitting a geographic coordinate corresponding to storage location of the item.

7. A method as set forth in claim 1 wherein said first selectively programmable identification device is a bar code storage device for selectively reading and storing the first item identifier, second item identifier, destination identifier, status identifier, transport means identifier and the storage location identifier.

8. A method as set forth in claim 1 further including the step of assigning the item to the identified transportation means using the transport means identifier.

9. A method as set forth in claim 1 further including the step of selectively altering the status identifier to prevent or allow shipment of the item.

10. A method as set forth in claim 1 wherein the status identifier contains the shipping availability of the item and the item is selected only if the stored status identifier indicates shipping availability.

11. A method as set forth in claim 1 wherein the item is a vehicle.

12. A method as set forth in claim 1 further comprising the step of generating a report including the location of the item.

13. A method as set forth in claim 1 wherein a rail car is used as a transport means.

14. A method for automatically tracking a vehicle within a storage area that is received by the storage area, stored in the storage area and shipped out of the storage area, said method comprising the steps of:

automatically assigning a first vehicle identifier indicative of an identity of the vehicle, a destination identifier indicative of a predetermined destination for the vehicle, a status identifier indicative of a status of the vehicle, and a storage location identifier indicative of a storage location of the vehicle within a storage area containing a plurality of stored vehicles;

storing the first vehicle identifier, destination identifier, status identifier, and location identifier in a first selectively programmable identification device having a processor, a memory and a transceiver that is operatively in communication with a second selectively programmable interrogation device having a processor, a memory and a transceiver that is also operatively in communication with a computer system;

assigning a second vehicle identifier to the vehicle that associates the vehicle with the first vehicle identifier, wherein the second vehicle identifier is stored in the memory of the first selectively programmable identification device;

affixing the first selectively programmable identification device to the vehicle when the vehicle is received;

modifying the storage location identifier if the vehicle is moved to another storage location within the storage area;

using the second selectively programmable interrogation device to locate a predetermined vehicle among the stored vehicles by interrogating each of the stored vehicle's first selectively programmable identification device and comparing the first vehicle identifier with the second vehicle identifier to locate the predetermined vehicle, and to read the destination identifier, status identifier and storage identifier if the first vehicle identifier compares to the second vehicle identifier, in order to track the location of the located vehicle within the storage area; and removing the first selectively programmable identification device before the located vehicle is shipped from the storage area.

15. A method as set forth in claim 14 further including the step of assigning a transport means identifier to the item indicative of how the item will be shipped, wherein the transport means identifier is stored in the memory of the first selectively programmable identification device.

16. A method as set forth in claim 15 further including the step of assigning the item to the identified transportation means using the transport means identifier.

17. A method as set forth in claim 14 including the first step of the first programmable identification device selectively transmitting a geographic coordinate corresponding to storage location of the item.

18. A method as set forth in claim 14 wherein said first selectively programmable identification device is a bar code storage device for selectively reading and storing the first item identifier, second item identifier, destination identifier, status identifier and the storage location identifier.

19. A method as set forth in claim 14 further including the step of selectively altering the status identifier to prevent or allow shipment of the item.

20. A method as set forth in claim 14 wherein the status identifier contains the shipping availability of the vehicle and the vehicle is selected only if the stored status identifier indicates shipping availability.

21. A method as set forth in claim 14 further comprising the step of generating a report including the location of the vehicle within the storage area and the status of the vehicle.

22. A method as set forth in claim 14 wherein a rail car is used as a transport means.

* * * * *